United States Patent
Gittins et al.

(10) Patent No.: US 11,603,742 B2
(45) Date of Patent: Mar. 14, 2023

(54) CONFORMANCE CONTROL IN HYDROCARBON RECOVERY

(71) Applicant: Cenovus Energy Inc., Calgary (CA)

(72) Inventors: Simon D. Gittins, Calgary (CA); Jason R. C. Griffiths, Calgary (CA); Michael Miller, Calgary (CA)

(73) Assignee: Cenovus Energy Inc., Calgary (CA)

( * ) Notice: Subject to any disclaimer, the term of this patent is extended or adjusted under 35 U.S.C. 154(b) by 0 days.

(21) Appl. No.: 17/352,164

(22) Filed: Jun. 18, 2021

(65) Prior Publication Data
US 2021/0396112 A1    Dec. 23, 2021

Related U.S. Application Data

(60) Provisional application No. 63/040,993, filed on Jun. 18, 2020.

(51) Int. Cl.
*E21B 43/24*    (2006.01)
*E21B 43/241*    (2006.01)

(52) U.S. Cl.
CPC ........ *E21B 43/2408* (2013.01); *E21B 43/241* (2013.01)

(58) Field of Classification Search
CPC ............................ E21B 43/2408; E21B 43/241
USPC ...................................................... 166/272.3
See application file for complete search history.

(56) References Cited

U.S. PATENT DOCUMENTS

| | | | |
|---|---|---|---|
| 2015/0075775 A1* | 3/2015 | Davidson | E21B 49/008 166/308.1 |
| 2017/0138160 A1* | 5/2017 | Yee | E21B 43/168 |
| 2018/0058202 A1* | 3/2018 | Disko | E21B 47/12 |
| 2018/0058209 A1* | 3/2018 | Song | E21B 47/107 |
| 2018/0087357 A1* | 3/2018 | Conn | E21B 43/2406 |

FOREIGN PATENT DOCUMENTS

| | | |
|---|---|---|
| CA | 2698898 A1 | 7/2011 |
| CA | 2834808 A1 | 12/2012 |
| CA | 2757125 A1 | 2/2013 |
| CA | 2831928 A1 | 5/2014 |
| CA | 2886934 A1 | 9/2015 |
| CA | 2853074 A1 | 11/2015 |
| CA | 2956771 A1 | 8/2017 |
| WO | 2011098328 A2 | 8/2011 |
| WO | 2013025420 A2 | 2/2013 |
| WO | 2013124744 A2 | 8/2013 |

* cited by examiner

*Primary Examiner* — William D Hutton, Jr.
*Assistant Examiner* — Ashish K Warma
(74) *Attorney, Agent, or Firm* — Gordon & Jacobson, P.C.

(57) ABSTRACT

Processes are provided for conformance control in the production of hydrocarbons from reservoirs, involving the distribution of mobilizing injection fluids into a formation through a number of injection fluid distribution points spaced apart along an injection well. The volume and/or position of mobilizing fluid outflows at the distribution points is adjusted based on criteria that include selected reservoir parameters measured at spatially distributed measurement points in the reservoir. An operational system is provided so that these measurements provide a proxy for recovery chamber conformance.

21 Claims, 14 Drawing Sheets

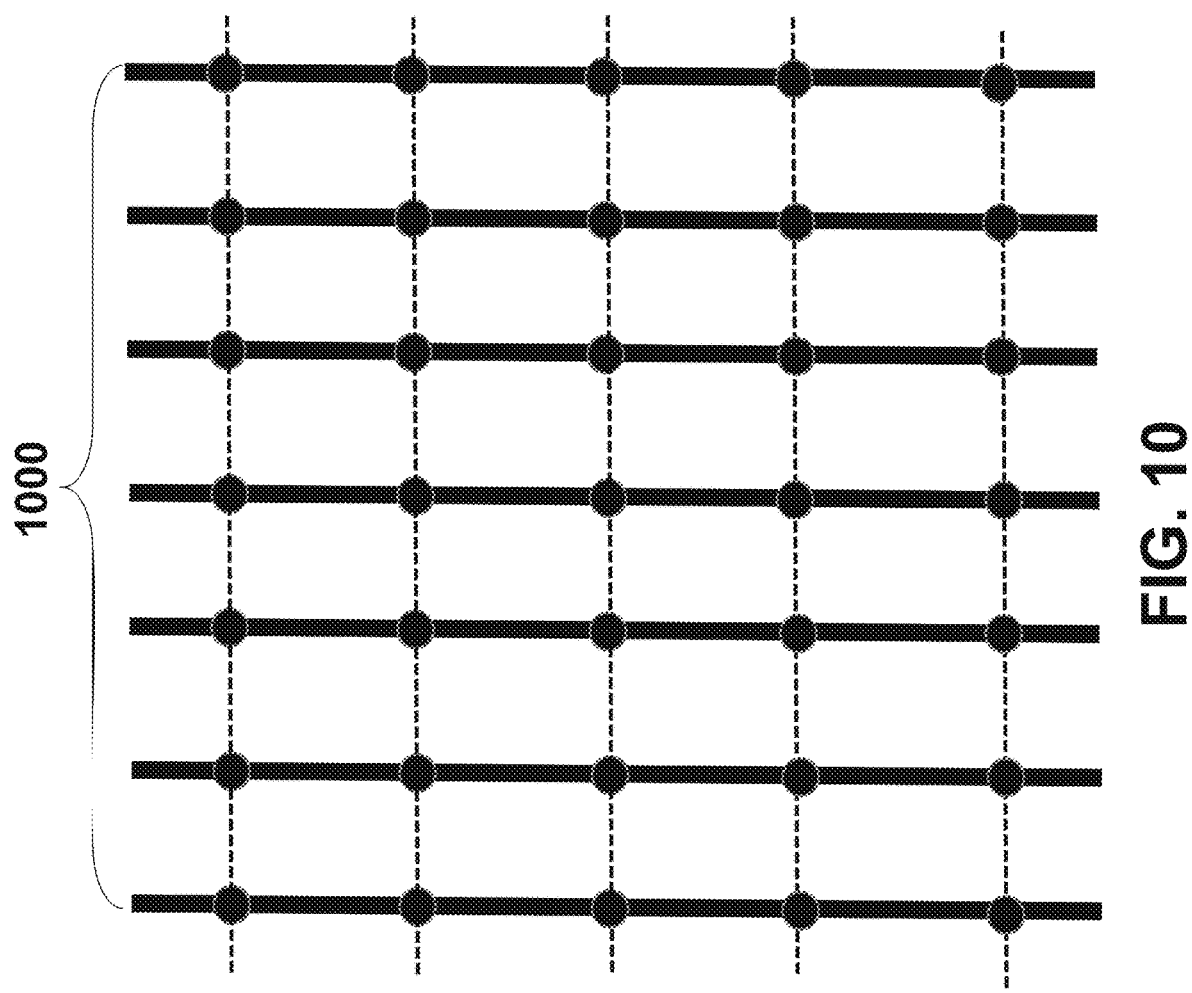

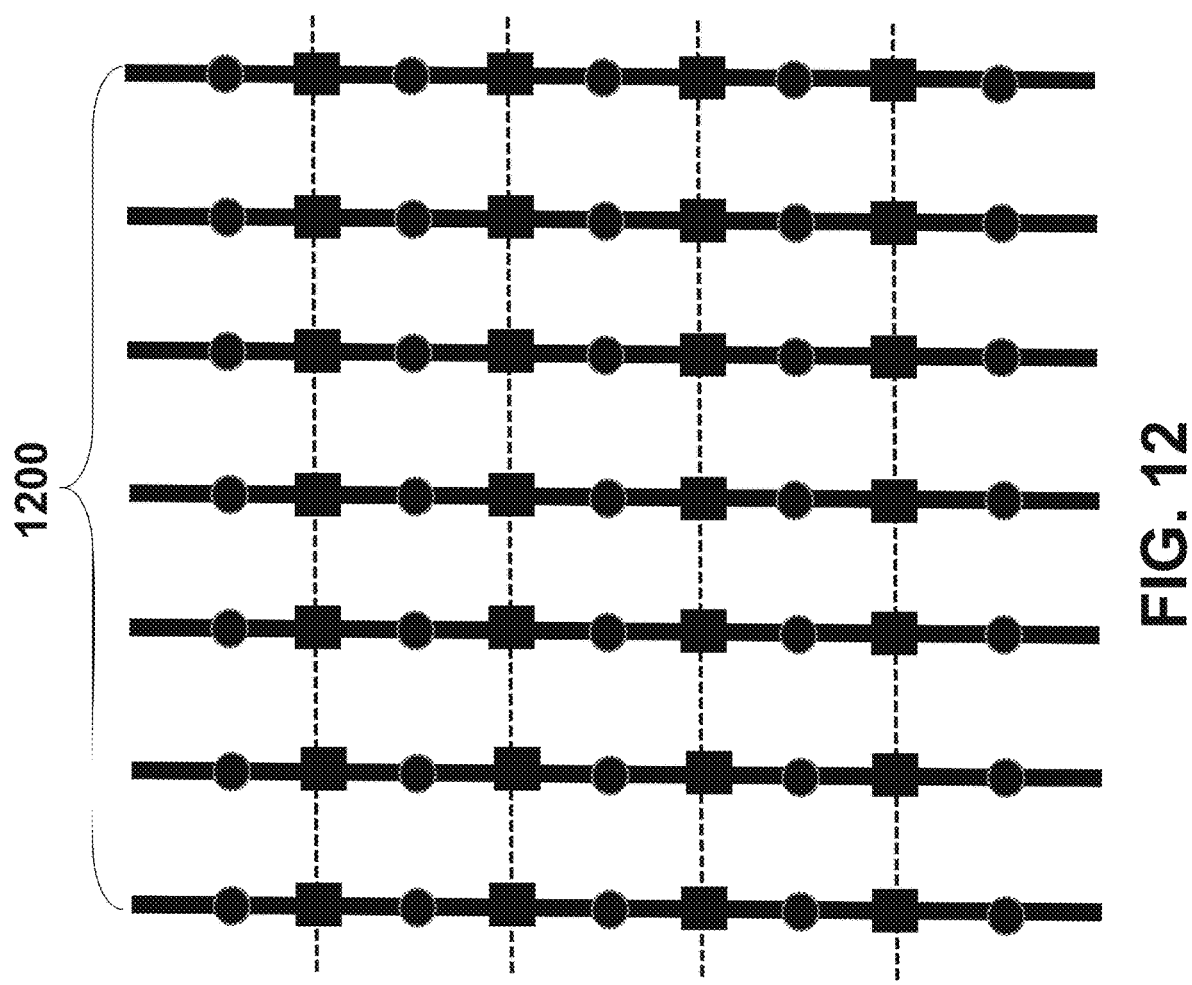

CONFORMANCE CONTROL IN HYDROCARBON RECOVERY

TECHNICAL FIELD

The present disclosure generally relates to in situ hydrocarbon recovery methods. More specifically, the present disclosure relates to methods for modulating thermal hydrocarbon recovery processes to improve conformance of a production chamber based on production parameters that serve as proxies for conformance.

BACKGROUND

Viscous hydrocarbons can be extracted from some subterranean reservoirs using in situ recovery processes. Some in situ recovery processes are thermal processes wherein heat energy is introduced to a reservoir to lower the viscosity of hydrocarbons in situ such that they can be recovered from a production well. In some thermal processes, heat energy is introduced by injecting a heated fluid such as steam, solvent, or a combination thereof into the reservoir by way of an injection well.

Thermal-recovery processes include steam-assisted gravity drainage (SAGD), solvent-aided processes (SAPs), and solvent-driven processes (SDPs). These processes are also primarily gravity-driven processes. During operation, an injection fluid such as steam and/or solvent is injected into a subterranean reservoir via an injection well to form a production chamber—i.e. a volume of the reservoir in which mobile injection fluid exits for an extended period of time. Latent heat from the injection fluid is transferred to the formation to heat viscous hydrocarbons in the production chamber, which increases their mobility. After sufficient heat transfer, the viscous hydrocarbons are sufficiently mobilized to drain vertically under the influence of gravity toward a production well.

The terms "steam chamber" or "production chamber" or "recovery chamber" accordingly refer to the volume of the reservoir which is perfused with injected fluids and from which mobilized oil has at least partially drained. Mobilized viscous hydrocarbons are typically recovered continuously through one or more production wells. The conditions of mobilizing fluid injection and of hydrocarbon production may be modulated to control the growth of the production chamber, for example to maximize oil production at the production well.

The "conformance" of a production chamber refers to the degree of homogeneity in the spatial growth of the chamber over time. Reduced conformance corresponds to uneven spatial growth. Conformance may be particularly problematic for some gravity-driven thermal-recovery processes in challenging reservoirs such as those comprising heterogeneous pay zones. Heterogeneous pay zones may include high-permeability hydrocarbon deposits bordered by, interbedded with, and/or interposed by low-permeability strata. Such geologic features often act as heat sinks in that they tend to receive substantial amounts latent heat from injection fluid without releasing commensurate hydrocarbons. Low-permeability strata may also limit the vertical-growth rate of production chamber, thereby reducing conformance and overall hydrocarbon production.

In various stages of thermal or solvent enhanced oil recovery processes, there are risks of unproductive short circuiting of an injected mobilizing fluid between an injection well and a production well. This may for example take the form of fluid (steam or gas or solvent vapour) coning, breakthrough, or short-circuiting, resulting in mobilizing fluid inflow into a production well. Similarly, undesirable non-condensing gas flows in a production chamber may be damaging to conformance and hydrocarbon recovery more generally. For example, in some instances thermal-recovery processes liberate significant quantities of reservoir gases, which tend to accumulate, slow chamber growth, and reduce heat transfer rates—all of which may affect conformance.

A very wide variety of flow control devices (FCDs) may be deployed to manage fluid flows in hydrocarbon recovery wells (see for example CA2853074, CA2834808, WO2011/098328, WO2013/025420 and WO2013/124744). FCDs may for example be tubing-deployed or liner-deployed, and may be shiftable in the sense of being operationally movable from time to time, from one position to another within a well. These include outflow control devices (OCDs), generally deployed on injection wells, and inflow control devices (ICDs), generally deployed on production wells. OCDs and ICDs may in turn be deployed in conjunction with a wide variety of well completions, for example including isolation packers and perforated casings arranged to segregate patterns of fluid flow in wells. There remains a need for systems that efficiently modulate fluid flows in enhanced oil recovery, particularly in thermal recovery techniques in heterogeneous reservoirs.

SUMMARY

Processes are provided for producing hydrocarbons from a subterranean reservoir in a formation that is serviced by a production well and an injection well, for example from heavy oil deposits making use of well pairs in a pattern adapted for SAGD production processes. Processes are provided that involve distributing a mobilizing injection fluid, such as steam and/or solvent, into the formation through a plurality of injection fluid distribution points, such as OCDs, spaced apart along an injection well. The volume and/or position of mobilizing fluid outflows at the distribution points may then be adjusted based on criteria that include one or more reservoir parameters, these parameters being measured at spatially distributed measurement points in the reservoir. It has been discovered that these measurements may be used to provide a proxy for recovery chamber conformance, where the reservoir parameters at a selected measurement point are compared at different measurement time points; and, the volume of production fluid flow through the production well is adjusted so that the production fluid flow rate through the production well is different at the different measurement time points. In this way, an elegantly simple measurement and control system is provided that facilitates what can otherwise be a challenging task of assessing and optimizing production chamber conformance.

The reservoir parameters may for example be assessed along the production well, providing production well parameters from measurement points spatially distributed along the production well. The reservoir parameters may also be assessed along the injection well, providing injection well parameters from measurement points spatially distributed along the injection well. The measured parameters may for example include temperature measurements and/or pressure measurements and/or seismic measurements and/or gas-production measurements. Temperature measurements may for example involve distributed temperature sensing along a length of the production well. Using such temperature measurements, processes are accordingly provided for recognizing reservoir hot and/or cold spots that are indicative of conformance disparities, and a system is then provided to adapt injected fluid patterns to address disparities in conformance. Gas-production measurements may for example involve distributed acoustic sensing (DAS) to distinguish gas flow from liquid flow.

One or more of the injection fluid distribution points may be equipped with an OCD such as a shiftable OCD, the position of the shiftable OCD being changed in response to the measured reservoir parameters.

The injection and production wells may include substantially-horizontal sections, as is common for SAGD well pairs, and the injection fluid distribution points may be spaced apart along the substantially-horizontal section of the injection well. As in SAGD well pairs, the substantially-horizontal section of the injection well may be spaced apart from and generally parallel to the substantially-horizontal section of the corresponding production well, for example being vertically spaced apart above the substantially-horizontal section of the production well, for example by about 2 m to about 20 m, or by about 3 m to about 10 m. The horizontal section of the production well may include a production-fluid-permeable liner, such as a louvered screen (e.g. a precision-punched screen), a wire-wrapped screen (e.g. direct or slip-on), a slotted liner, and/or a mesh-type liner. In some implementations, the horizontal section of the production well may include one or more inflow control devices (ICDs).

The mobilizing injection fluid may alternatively be steam, a solvent, a non-condensable gas (NCG), or any combination thereof. The solvent may for example include propane, butane, diluent, natural gas condensate, or combinations thereof. NCGs may include methane, ethane, $O_2$, $CO_2$, $N_2$, CO, $H_2S$, $H_2$, $NH_3$, flue gas, or combinations thereof.

Processes may be adapted for use in thin pay reservoirs, for example having a height of 5 m to 15 m, or in reservoirs that include one or more low-permeability strata, for example having a permeability of less than about 10 mD. Low-permeability strata may for example include inclined heterolithic strata (IHS).

Other aspects and features of the methods of the present disclosure will become apparent to those ordinarily skilled in the art upon review of the following description of specific embodiments.

BRIEF DESCRIPTION OF THE DRAWINGS

These and other features of the present disclosure will become more apparent in the following description in which reference is made to the appended drawings. The appended drawings illustrate one or more embodiments of the present disclosure by way of example only and are not to be construed as limiting the scope of the present disclosure.

FIG. 10 shows a schematic representation in plan view of a well configuration for a conventional SAGD process.

FIG. 12 shows a schematic representation in plan view of a well configuration in accordance with the method of the present disclosure.

DETAILED DESCRIPTION

Figure 1A:
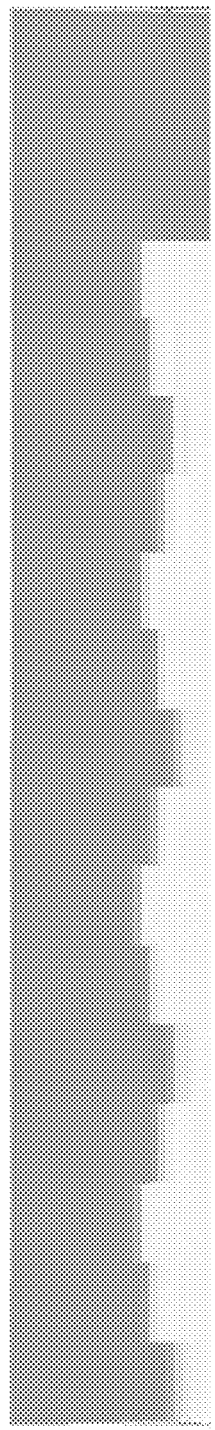
FIG. 1A shows a simulated reservoir for a conventional SAGD method in plan view one year into a ramp-up phase.

As noted above, thermal recovery techniques often give rise to challenging tasks associated with assessing and modulating gas-phase flow to the production well. The potential variability is confounding, for example because of the interplays between complex reservoir geologies, multi-component gas mixtures, and dynamic flow conditions (e.g. flow (coning, breakthrough, and/or short-circuiting). Conventional approaches to managing gas-phase flow to the production well centre on inflow control devices (ICDs) the production well. The present disclosure provides an alternative approach. The present disclosure reports that outflow control devices (OCDs), when deployed and operated strategically in the injection well, can be utilized to control excess gas phase flow to the production well. Importantly the configurations of the OCDs in the injection well are modulated based on indications of gas inflow in the production well, and this may be done to alter local pressure gradients. It has been discovered that these indications may be used to provide a proxy for recovery chamber conformance and/or as proxy for particular flow states into the production well. In the methods of the present disclosure, reservoir parameters at selected measurement points are compared at different time points, and the injection parameters are adjusted accordingly. This ongoing process of evaluation and adjustment may take place even after steam chambers have coalesced, with steam chambers from neighboring well pairs joining to form a common merged steam chamber. For example, in the context of coalesced steam chambers, OCDs may be opened and closed and moved in order to mitigate hot and/or cold spots along the production wells in accordance with methods of the present disclosure.

Processes are provided for producing hydrocarbons from a subterranean reservoir in a formation that is serviced by a production well and an injection well, for example from heavy oil deposits making use of well pairs in a pattern adapted for SAGD production processes. The injection well and the production well are typically connected to respective corresponding surface facilities, which typically include an injection surface facility and a production surface facility. The injection surface facility may be configured and operated to supply injection fluids, such as steam, solvent or combinations thereof into the injection well. The production surface facility is configured and operated to produce fluids collected in the production well to the surface. In select embodiments, co-injected fluids or materials may be pre-mixed before injection. In other embodiments, co-injected fluids may be separately supplied into the injection well. In particular, the injection surface facility may be used to supply steam into the injection well in a first phase, and a mixture of steam and solvent into the injection well in a second phase. In the second phase, the solvent may be pre-mixed with steam at surface before co-injection. Alternatively, the solvent and steam may be separately fed into the injection well for injection into the reservoir. Optionally, the injection surface facility may include a heating facility (not separately shown) for pre-heating the solvent before injection.

The injection well typically has an injector casing and the production well has a production casing. An injector tubing is typically positioned in the injector casing. The injector casing may include a slotted liner along the horizontal section of well for injecting fluids into the reservoir. Production casing may also be completed with a slotted liner along the horizontal section of well for collecting fluids drained from the reservoir by gravity (i.e. in a gravity-dominated process). In select embodiments, the production well may be configured and completed similarly to the injection well. In select embodiments, each of the injection well and the production well may be configured and completed for both injection and production.

Mobilizing injection fluid, such as steam and/or solvent, may accordingly be distributed into the formation through a plurality of injection fluid distribution points, such as OCDs, spaced apart along an injection well, and in some embodiments including the well bore. The provision of a plurality of injection fluid distribution points allows the volume and/or position of mobilizing fluid outflows at the distribution points to be adjusted, and this adjustment in the present processes may be based on criteria that include one or more reservoir parameters that are measured at spatially distributed measurement points in the reservoir. Use of the present processes has established that these measurements may be used to provide a proxy for recovery chamber conformance. In particular, the ability of these measurements to serve as conformance proxies is established where the reservoir parameters at a selected measurement point are compared at different measurement time points; and, the volume of production fluid flow through the production well is adjusted so that the production fluid flow rate through the production well is different at the different measurement time points.

In select embodiments, production processes are provided that make use of injector tubing deployed shiftable OCDs. In other embodiments, production processes are provided that make use of liner deployed shiftable OCDs. In both cases, the OCDs may be used in a variety of configurations (including various types, numbers, sizes, intervals and initial configurations of OCDs), in conjunction with a variety of operating strategies (involving the variable timing of the opening and closing of the OCDs) for distribution of steam from a SAGD injection well into the reservoir. In select implementations, the number of OCDs included along the length of an injection well (including in some embodiments, the well bore), as well as the interval between adjacent OCDs and the sizing of each of the OCDs (for example the number and size of flow ports in the devices), along with the initial configurations (for example the selection of which OCDs start closed and which start open) may be designed to facilitate the optimization of steam distribution from the injection well into the reservoir over the life of a SAGD well pair. It has been discovered in practice that these operational parameters of the present processes may be adjusted so as to facilitate the development and maintenance of improved steam chamber conformance (for example facilitating steam chamber development along the full length of a well pair). In select embodiments of the present disclosure, the intervals between OCDs may be regular or irregular (such as when OCD placement is in part determined by near-well-bore geology).

The reservoir may be subjected to an initial phase, for example as part of a SAGD process, referred to as the "start-up" phase or stage. Typically, start-up involves establishing fluid communication between the injection well and the production well. To permit drainage of mobilized hydrocarbons and condensate to the production well, fluid communication between the injection well and the production well must be established in the inter-well zone. Fluid communication in this context refers to fluid flow between the injection and production wells. Establishment of such fluid communication typically involves mobilizing viscous hydrocarbons in the reservoir to form a mobilized reservoir fluid and removing the mobilized reservoir fluid to create a porous pathway between the wells. Viscous hydrocarbons may be mobilized by heating such as by injecting or circulating pressurized steam or hot water through the injection well or the production well. In some cases, steam may be injected into, or circulated in, both the injection well and the production well for faster start-up. A pressure differential may be applied between the injection well and the production well to promote steam/hot water penetration into the porous geological formation that lies between the wells of the well pair. The pressure differential promotes fluid flow and convective heat transfer to facilitate communication between the wells.

Additionally or alternatively, other techniques may be employed during the start-up stage. For example, to facilitate fluid communication, a solvent may be injected into the reservoir region around and between the injection well and the production well. The region may be soaked with a solvent before or after steam injection. An example of start-up using solvent injection is disclosed in CA 2,698,898. In further examples, the start-up phase may include one or more start-up processes or techniques disclosed in CA 2,886,934, CA 2,757,125, or CA 2,831,928.

Once fluid communication between the injection well and the production well has been achieved, oil production or recovery may commence, employing one or more iterations of forced solvent cycling. As a result of depletion of the heavy hydrocarbons, a porous region is formed in the reservoir, which is referred to as a vapor or production or recovery chamber. The mobilized hydrocarbons drained towards the production well and collected in the production well are then produced (transferred to the surface), such as by gas lifting or through pumping.

In some implementations, during the start up phase of SAGD operations, the present processes may involve closing all, or substantially all, or a majority, of the ports along the length of an injection or production tubing in a SAGD well pair. In this way, steam can be circulated to the toe of each well and back along the liner on the outside of the tubing (without flowing out into the liner part way), allowing the wells to be maintained at steam temperature. After a well pair has started up (communication has been achieved between the injector and producer) some or all of the OCDs or ports can be opened to allow injected steam to flow out into the liner and along the liner to be distributed into the reservoir in a configuration which is designed to promote full length steam chamber development. Initially this configuration may for example involve opening only the OCD at the toe of the well (or leaving all OCDs closed if an open ended tubing is used) in order to promote steam chamber development at the toe, which can be the hardest part of a SAGD well pair to get started, especially in extended length well pairs (for example being up to approximately 800 m, 1,000 m, 1,200 m, 1,600 m, and/or up to 3,000 m in length). There may also be start up challenges with well pairs having complex well trajectories and/or reservoirs having geological complexities (such as barriers and baffles, or thief zones, or top or bottom water zones). In select implementations, once inter-well communication has been initiated in the toe region of a well pair, all or some of the other OCDs may be opened.

Aspects of the present processes make use of various measured reservoir parameters, and these parameters are determined at distinct measurement points in the reservoir. In select implementations, distributed temperature sensing (DTS) fiber optic temperature measurements have for example been taken along the length of a production well. It has been discovered that by comparing flowing production well temperature profiles to shut-in temperature profiles it is possible to discern conformance, i.e. where and how well the steam chamber is developing. Parameters of this kind may be augmented by other parameters, such as measurements from temperature observation wells, 4D seismic assessments, distributed acoustic sensing (DAS), logging information, and/or other measurement techniques. It has been found that if steam chamber development is less than the full length of the well pair, then the open/closed configuration of some or all of the OCDs along the injection well can be modified in order to improve the steam chamber development (i.e. conformance).

In a select example of processes for improving conformance, reservoir parameters may be monitored to identify a circumstance where the measured reservoir parameters at a measurement point indicate that there is a location close to an open OCD in the injection well where the flowing temperature in the production well is high and remains high during production shut-in, or during reduced production fluid flow (the elevation of temperature being relative, for example, to other segments or the full length of the production well). The existence of this condition may then be taken as an indication that steam is short circuiting from the injector to the producer at this location. Short circuiting of this kind leads to less effective steam chamber development at other locations, i.e. reduced conformance. Accordingly, in this circumstance the OCD nearest to the relevant measurement point may be closed to mitigate this effect.

In an alternative select example of processes for improving conformance, reservoir parameters may be monitored and, if the shut-in temperature at a measurement point in the production well close to a closed OCD in the injection well drops during shut-in, or reduced production fluid flow, to a low temperature (relative to other segments along the length of the production well), this may be taken as an indication that emulsion or non-condensable (insulating) gas is accumulating at this location. In this circumstance, the nearest OCD may be opened in order to help push emulsion into the production well, or sweep gas away from this location. The modulation of the mobilizing fluid (steam) outflow, thereby mitigates a conformance problem and allows the steam chamber to develop more efficiently. In addition to opening the nearest OCD, one or more remote OCDs may be closed in order to direct a greater quantity of the injection fluid to the nearest OCD.

As outlined above, reservoir parameters that are assessed along the length of the production well, such as temperature measurements and/or pressure measurements and/or seismic measurements, may be used to recognizing reservoir locations, for example hot spots, that are indicative of conformance. The present processes accordingly provide a system that adapts injected fluid patterns to address these detected disparities in conformance.

In select implementations of the present processes, over the life of a well pair (e.g. a SAGD well pair), OCD configurations may be evaluated periodically based on measurements of reservoir parameters, and OCD configurations may then be adjusted so as to optimize steam chamber development and conformance. This ongoing process of evaluation and adjustment may take place even after steam chambers have coalesced, with steam chambers from neighboring well pairs joining to form a common merged steam chamber. In the context of coalesced steam chambers, OCDs may be opened and closed and moved in order to mitigate hot and cold spots along the production wells. This evaluation and adjustment process may also be carried out, particularly at later production stages, so as to create a desired pressure gradient in a steam chamber, for example so as to sweep gas along the steam chamber and/or across from one well pair's steam chamber to an adjacent well pair's steam chamber. Again, this process may be managed so as to continue to optimize conformance across multiple well pairs or pads.

The foregoing aspects of the present processes have been described with reference to the use of steam as a mobilizing fluid. In alternative embodiments, other mobilizing fluids may be used, such as solvents. The solvent for use in alternative aspects of the present processes may be selected based on a number of considerations and factors, for example as set out in CA2956771. The solvent may be injectable as a vapor, and may be selected on the basis of being suitable for dissolving at least one of the heavy hydrocarbons to be recovered from the reservoir. The solvent may be a viscosity-reducing solvent, which reduces the viscosity of the heavy hydrocarbons in the reservoir. Suitable solvents may include C2 to C10 linear, branched, or cyclic alkanes, alkenes, or alkynes, in substituted or unsubstituted form, or other aliphatic or aromatic compounds. Select embodiments may for example use an n-alkane as the dominant solvent, for example propane, butane, pentane or mixtures thereof. For a given selected solvent, the corresponding operating parameters during co-injection of the solvent with steam may also be selected or determined in view the properties and characteristics of the selected solvent. The mass fraction of the solvent may for example be greater than 20% and enough steam may be added to ensure that the injected solvent is substantially in the vapor phase.

In a given application, the solvent may be selected based on its volatility and solubility in the reservoir fluid.

The solvent may be heated to vaporize the solvent. For example, when the solvent is propane, it may be heated with hot water at a selected temperature such as, for example, about 100° C. Additionally or alternatively, solvent may be mixed or co-injected with steam to heat the solvent to vaporize it and to maintain the solvent in vapor phase. Depending on whether the solvent is pre-heated at surface, the weight ratio of steam in the injection stream should be high enough to provide sufficient heat to the co-injected solvent to maintain the injected solvent in the vapor phase. If the feed solvent from surface is in the liquid phase, more steam may be required to both vaporize the solvent and maintain the solvent in the vapor phase as the solvent travels through the vapor chamber 260.

In the context of the present disclosure, the word "hydrocarbon" is generally used interchangeably with "petroleum" and/or "oil" to refer to mixtures of widely varying composition, as will be evident from the context in which the word is used. It is common practice to categorize hydrocarbon substances of high viscosity and density into two categories, "heavy oil" and "bitumen". For example, some sources define "heavy oil" as a hydrocarbon-containing mixture that has a mass density of greater than about 900 kg/m$^3$. Bitumen is sometimes described as that portion of a hydrocarbon-containing mixture that exists in the semi-solid or solid phase in natural deposits, with a mass density greater than about 1000 kg/m$^3$ and a viscosity greater than about 10,000 centipoise (cP; or 10 Pa·s) measured at original temperature in the deposit and atmospheric pressure, on a gas-free basis. Although these terms are in common use, references to heavy oil and bitumen represent categories of convenience, and there is a continuum of properties between heavy oil and bitumen. Accordingly, references to heavy oil and/or bitumen herein include the continuum of such substances, and do not imply the existence of some fixed and universally recognized boundary between the two substances. In particular, the term "heavy oil" includes within its scope all "bitumen" including hydrocarbons that are present in semi-solid or solid form.

In the context of the present disclosure, a "reservoir" or "hydrocarbon-bearing formation" is a subsurface formation containing one or more natural accumulations of moveable hydrocarbons, which are generally confined by relatively impermeable rock. An "oil sand" reservoir is generally comprised of strata of sand or sandstone containing viscous hydrocarbons, such as bitumen. Viscous petroleum, such as bitumen, may also be found in reservoirs whose solid structure consists of carbonate material rather than sand material. Such reservoirs are sometimes referred to as "bituminous carbonates".

In the context of the present disclosure, the permeability of the hydrocarbon-bearing formation refers to the degree to which hydrocarbons can flow through the hydrocarbon-bearing formation. High-permeability hydrocarbon-bearing formations are those having permeabilities of greater than about 10 mD and include but are not limited to those that are sand-dominated and that have sand facies. High-permeability formations are often bordered by, interbedded with, and/or interposed by low-permeability strata such as shale lamina and mud clasts. Low-permeability strata are layers of material that have a permeability of less than about 10 mD. Inclined heterolithic strata (IHS)—heterogeneous deposits that include layers of high-permeability material and low-permeability material and that offset from their depositional plane—are one such example. IHS typically consist of repeating cycles of interbedded sand-dominated layers and mud-dominated layers. Geophysical data suggests that, in at least some instances, IHS result from lateral growth of large-scale bedforms such as point bars. IHS are typically classified based on their volume percentage of mud-dominated material. IHS comprising greater than 30 vol. % mud-based materials are said to be mud-dominated IHS, and IHS comprising less than 30 vol. % are said to be sand-dominated IHS.

In the context of the present disclosure, the term "mobilizing fluid" is intended to refer to liquids or gases that are injected into a reservoir to mobilize hydrocarbons contained therein. Such fluids may include steam, solvents, non-condensable gases (NCG), or a combination thereof. For example, the solvents may comprise propane, butane, diluent, natural gas condensate, or a combination thereof. The NCG may comprise methane, ethane, $O_2$, $CO_2$, $N_2$, CO, $H_2S$, $H_2$, $NH_3$, flue gas, or a combination thereof.

As is typical of such well pair configurations, the injection well may be vertically spaced from the production well, such as at a distance of about 5 m. The distance between the injection well 120 and the production well in a well pair may vary and may be selected to optimize forced solvent cycling operations. In select embodiments, the horizontal sections of the injection well and the production well may be about 800 m to about 1000 m in length, or longer. For example, the horizontal sections of the injection well and the production well may be up to about 3,000 m in length. In other embodiments, these lengths may be varied and the overall pattern of well pairs may vary widely. The injection well and the production well may each be configured and completed according to a wide variety of suitable techniques available in the art. The injection well and the production well may also be referred to as the "injector" and "producer", respectively.

As well, in select embodiments the substantially-horizontal sections of the substantially-horizontal sections of each of the first and the second well may be parallel. However, it is also contemplated that the substantially-horizontal sections of the well may be angularly offset. That is, the substantially-horizontal sections of each of the wells may converge together or diverge away from each other. In further embodiments, the first and second well may be positioned about 3 m to about 10 m away from each other. In certain embodiments, the first well and the second well may be positioned (i) about 3 m to about 5 m; (ii) about 5 m to about 8 m; or (iii) about 8 m to about 10 m away from each other. In a particular embodiment, the first well and the second well are positioned about 5 m away from each other.

According to select embodiments of the present disclosure, the subterranean reservoir is a thin pay reservoir. In the context of the present disclosure, thin pay reservoirs have a height of about 5 m to about 15 m. In certain embodiments, the reservoir has a height of (i) about 8 m to about 12 m; (ii) about 5 m to about 8 m; or (iii) about 12 m to about 15 m. Of course, as will be appreciated from the description provided herein, the methods of the present disclosure may be suitable for use in reservoirs having a height greater or less than the defined ranges.

According to select embodiments, the subterranean reservoir comprises one or more low-permeability strata. As discussed above, the subterranean reservoir may be bordered by, interbedded with, and/or interposed by the one or more low-permeability strata. Further, in some embodiments, the one or more low-permeability strata have a permeability of less than about 10 mD. The one or more low-permeability strata may be in the form of generally horizontal layers.

Alternatively, in some embodiments, the one or more low-permeability strata comprise inclined heterolithic strata. Further, as discussed above, the one or more low-permeability strata may comprise shale lamina and/or mud clasts.

Reservoirs containing heavy hydrocarbons are typically below an overburden, which may also be referred to as a cap layer or cap rock. The overburden may be formed of a layer of impermeable material such as clay or shale. Under natural conditions (e.g. prior to the application of a recovery process), the reservoir is typically at a relatively low temperature, such as about 12° C., and the formation pressure may be from about 0.1 to about 4 MPa (1 MPa=1,000 Pa), depending on the location and other characteristics of the reservoir. A pair of wells, including an injection well and a production well, are drilled into and extend substantially horizontally in the reservoir for producing hydrocarbons from the reservoir. The well pair is typically positioned away from the top of the reservoir, which is defined by the lower edge of the overburden, and positioned near the bottom of a pay zone or geological stratum in the reservoir.

Further, in select embodiments of the present disclosure, the subterranean reservoir may be under native conditions prior to the penetrating of the subterranean reservoir. In the context of the present disclosure, a reservoir under "native conditions" refers to a reservoir that has not been substantially influenced by a prior thermal-recovery process (e.g. SAGD, SAP, or SDP). Alternatively, in other embodiments, the subterranean reservoir has been pre-heated by a prior thermal-recovery process. For example, the transverse-drive methods of the present disclosure may be used to access a thin pay attic that has been conductively pre-heated by an earlier thermal-recovery process.

EXAMPLES

Example 1

State-of-the-art simulation protocols were used to compare an archetypal method of the present disclosure to a conventional SAGD method using a well-characterized field well pair to set reservoir parameters. Average properties for the well pair are set out in Table 1.

TABLE 1

Simulation properties for series of comparisons between a conventional SAGD method and a method in accordance with the present disclosure.

| Property | Units | Value |
| --- | --- | --- |
| Solid | N/A | McMurray Sand |
| KH | D | 3.5 |
| KV | D | 7 |
| Porosity | N/A | 0-0.33 |
| Pay Thickness | m | 20 |
| Well Length | m | 900 |
| Well spacing | m | 100 |

The well pair included an injection well and a production well arranged in a typical SAGD configuration. The injection well was simulated to be about 5 m above the production well at the heel and along the first 750 m of the horizontal section. The injection well was simulated to be about 7 m above the production well over the toe and the last 150 m of the horizontal section. The injection well was simulated to include injection tubing with an open toe and four shiftable OCDs spaced at 125 m, 325 m, 525 m and 725 m with the heel at 0 m and open toe at 900 m.

As set out below with reference to FIG. 1-FIG. 3, simulations were conducted for a conventional SAGD method and a method in accordance with the present disclosure where the volume and position of mobilizing fluid outflows from the injection well were adjusted in response to spatially-distributed reservoir measurements. In the conventional SAGD method, a typical start-up phase was followed by a two-year ramp-up phase during which all of the OCDs were configured in the open position. In the method in accordance with the present disclosure, the same start-up phase was executed but the OCDs were not opened until about nine months after the end of the start-up phase based on simulation data that reflects that obtainable by temperature profile from the production well in the field.

Figure 1B:
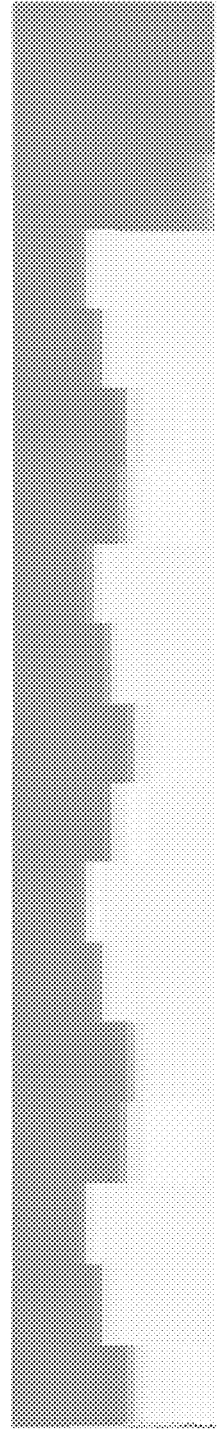
FIG. 1B shows a simulated reservoir for a conventional SAGD method in plan view two years into a ramp-up phase.
Figure 2A:
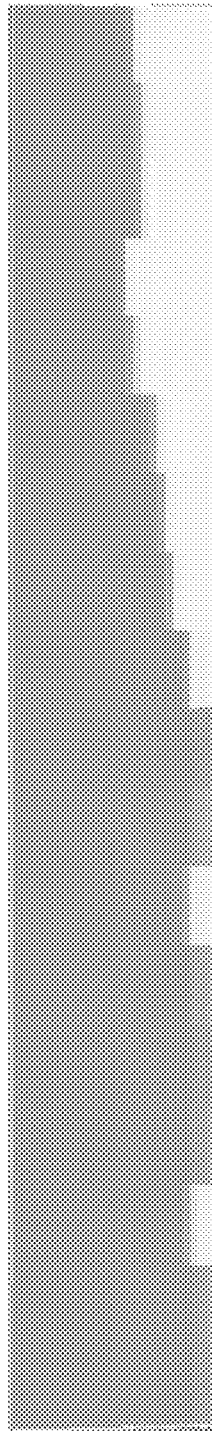
FIG. 2A shows a simulated reservoir for a method in accordance with the present disclosure in plan view one year into a ramp-up phase.
Figure 2B:
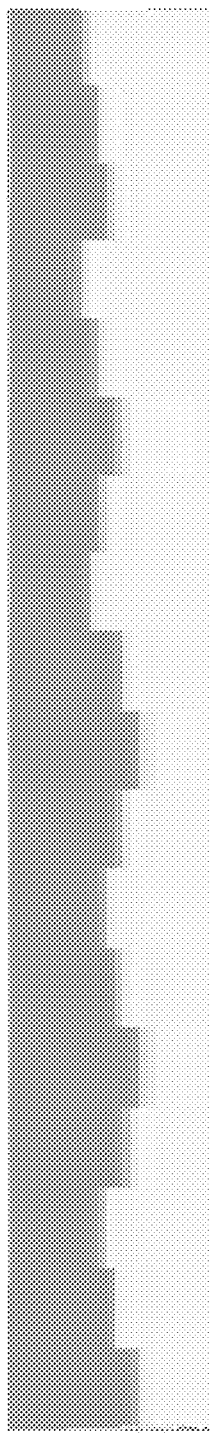
FIG. 2B shows a simulated reservoir for a method in accordance with the present disclosure in plan view two years into a ramp-up phase.

FIG. 1A and FIG. 1B show the simulated reservoir for the conventional SAGD method in plan view one year into the ramp-up phase and two years into the ramp-up phase, respectively. FIG. 2A and FIG. 2B show the simulated reservoir for the method in accordance with the present disclosure in plan view one year into the ramp-up phase and two years into the ramp-up phase, respectively. In FIG. 1A-B and FIG. 2A-B, chamber development is indicated by saturation gradient, where lighter shades indicate increased gas saturation (i.e. chamber development). FIG. 1A and FIG. 1B indicate that the conventional SAGD method did not achieve substantial chamber development in the 150 m section at the toe where the well pair spacing was higher. In contrast, the method in accordance with the present disclosure provided substantial chamber development in the 150 m section at the toe, as shown in FIG. 2A. This may reflect that, in accordance with a method of the present disclosure, maintaining the OCDs in the closed position for the first nine months of the ramp-up period resulted in more of the injected steam passing through open toe of the injection well, which may have resulted in higher pressure/temperature at the toe. The higher pressure/temperature at the toe may enhance inter-well communication and steam chamber growth in this region, as measured at the production well in the field or through simulation data in the present context. Related results (see, e.g. FIG. 3) indicate that maintaining the OCDs in the closed position for the first nine months of the ramp-up period also limited the overall steam injection rate, which restricted steam chamber development over the rest of the well pair as seen in FIG. 2A. During simulation of the method in accordance with the present disclosure, configuring all of the OCDs in the open position after 9 months removed the restriction on steam rates, and this lead to continued steam chamber development along a greater portion of the length of the well pair and improved conformance after two years (as shown in FIG. 2B) relative to the conventional SAGD method.

Figure 3:
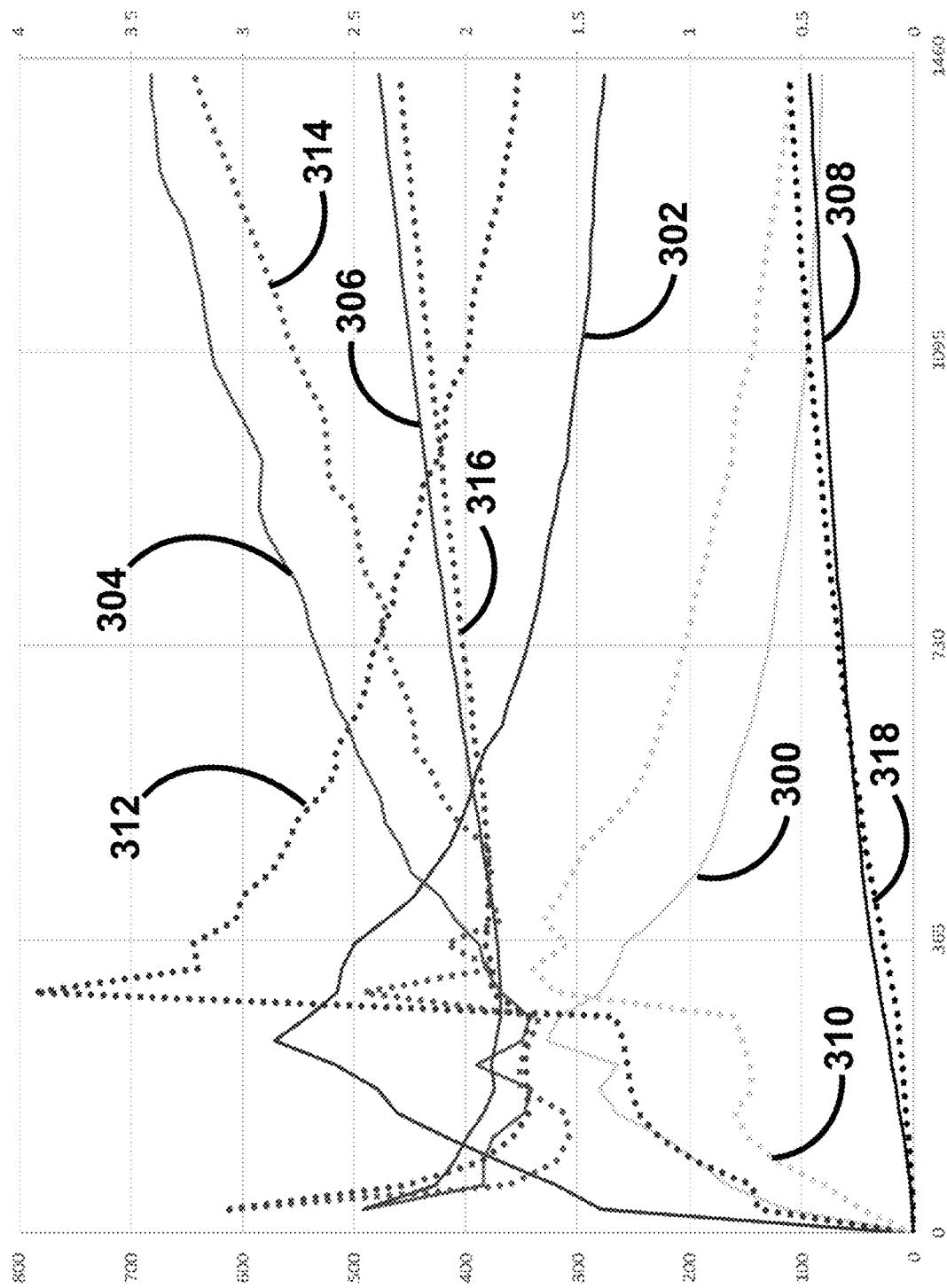
FIG. 3 shows plots of various production parameters as a function of time for both a conventional SAGD method and a method in accordance with the present disclosure.

FIG. 3 shows plots of various production parameters as a function of time for both the conventional SAGD method and the method in accordance with the present disclosure. In FIG. 3, oil production rate, steam injection rate, instantaneous steam oil ratio (iSOR), cumulative steam oil ratio (cSOR), and recovery factor are indicated by reference numbers 300, 302, 304, 306, and 308, respectively for the conventional method. In FIG. 3, oil production rate, steam injection rate, iSOR, cSOR, and recover factor are indicated by reference numbers 310, 312, 314, 316, and 318, respectively for the method in accordance with the present disclosure. FIG. 3 indicates that the method in accordance with the present disclosure had lower steam injection and oil production rates for the first nine months of the ramp up phase, but much higher rates thereafter relative to the conventional SAGD method. The higher rates associated with the method in accordance with the present disclosure relative to the conventional SAGD method may be due to the increased steam chamber length and/or conformance, both of which correlate with improved recovery and SOR over the full life of the well pair.

Example 2

At any time during a hydrocarbon recovery process, if a location on the production well is measured to have a relatively high in-flow temperature, and if the temperature of the location remains high during production shut-in (relative to the rest of the length of the production well) this may indicate that injection fluid is short circuiting from the injection well to the production well at or near this location. Short circuiting may lead to less effective steam chamber development at other locations and, in accordance with the methods of the present disclosure, the nearest OCDs may be closed to mitigate this effect. Likewise, if the shut-in temperature at a point on the production well is near a closed injection-well OCD, and if the temperature at this point drops to a relatively low temperature during shut-in (relative to the rest of the length of the production well) this may indicate that emulsion or non-condensable gas is accumulating at this location and the nearest OCD may be opened to increase the local rate of emulsion flow into the production well and/or to sweep high gas-concentration fluids away from this location. In this way, OCD configurations may be evaluated periodically based on production-well measurements and adjusted to influence steam chamber development.

As set out below with reference to FIG. 4-FIG. 9, simulations were conducted for a conventional SAGD method and a method in accordance with the present disclosure where, during production, the volume and position of mobilizing fluid outflows from the injection well were adjusted in response to spatially-distributed reservoir measurements. In the conventional method, a typical start-up phase was followed by a production phase during which all of the OCDs were configured in the open position. In the method in accordance with the present disclosure, the same start-up phase was executed but one of the OCDs was configured in the closed position (the closest one to the heel) having regard to simulation data that reflects spatially-distributed reservoir measurements, while the rest of the OCDs were configured in the open position. The simulation parameters for Example 2 were the same as those of Example 1, with the exception that the injection well was configured with five OCDs spaced at 75 m, 225 m, 375 m, 525 m and 675 m with the heel at 0 m and the open toe at 900 m.

Figure 4:
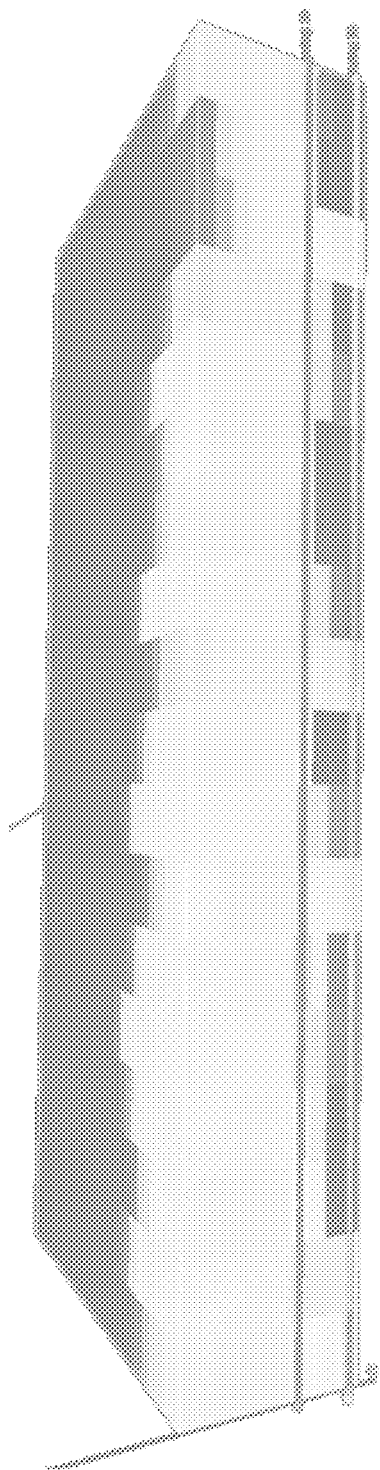
FIG. 4 shows a perspective view of steam chamber development along a simulated reservoir after one year of conventional SAGD production.

FIG. 4 shows steam chamber development along the 900 m length and 50 m half width of the reservoir after one year of conventional SAGD production. In FIG. 4, chamber development is indicated by saturation gradient, where lighter shades indicate increased gas saturation. FIG. 4 suggests that the steam chamber developed along the full length of the well pair after one year, but also that the gas saturation near the heel reached the production well elevation indicating steam flow from the injection well to the production at this location (as well as additional locations further along the well pair).

Figure 5:
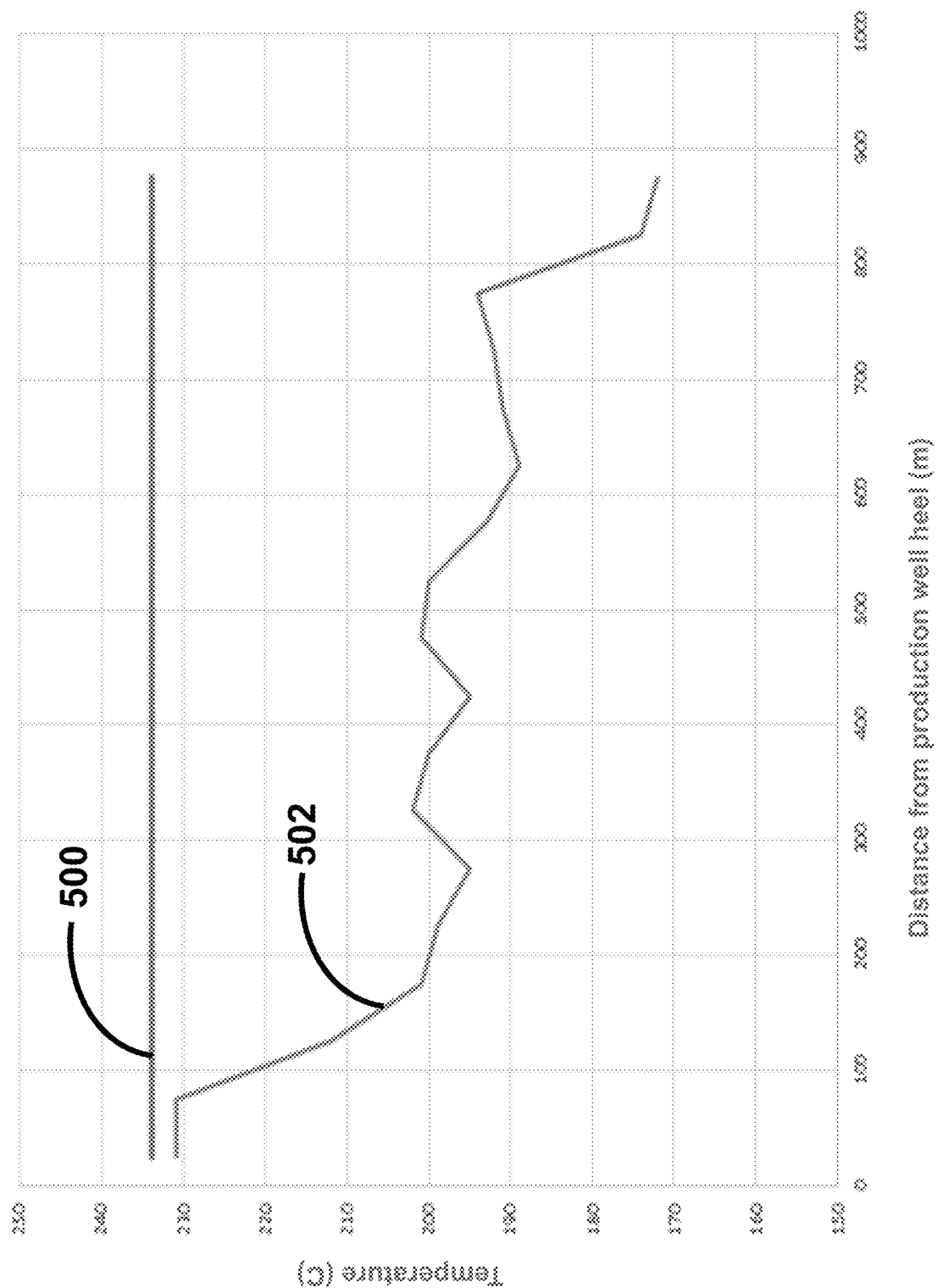
FIG. 5 shows the simulated steam temperature and the simulated temperature profile of a production well after a 24-hour shut-in period following one year of conventional SAGD production.

FIG. 5 shows the simulated steam temperature and the temperature profile along the production well (as may be measured in the field with distributed temperature sensing, for example) after a 24 hour shut-in period following 1 year of conventional SAGD production. In FIG. 5, steam temperature at the injection well is indicated by reference number 500 and the inflow temperature along the length of the production well is indicated by reference number 502. The plots 500 and 502 indicate that produced fluids entering the well at the heel are close to steam temperature (i.e. a hot spot) while further along the well temperatures are more than 30° C. below steam temperature.

Figure 6:
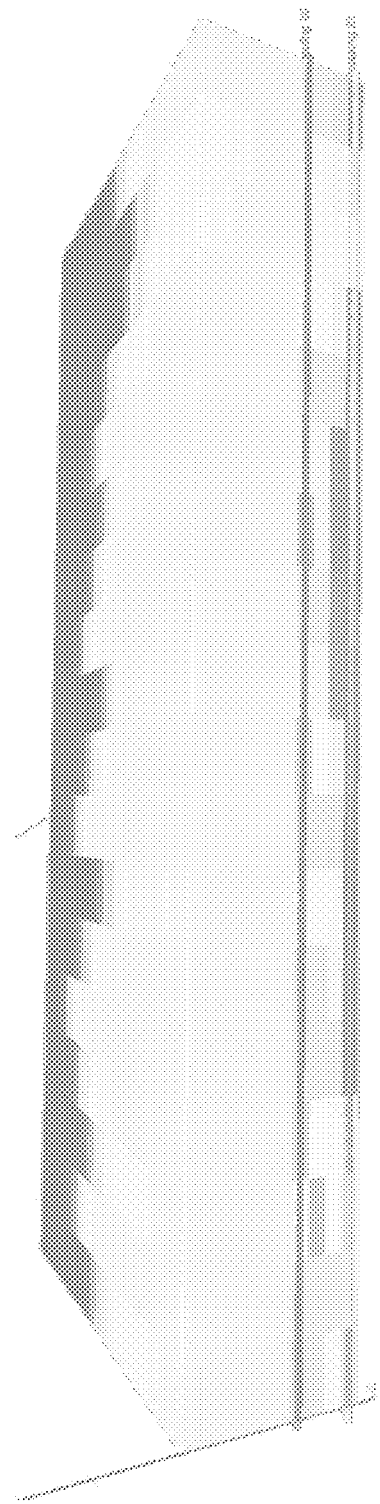
FIG. 6 shows a perspective view of steam chamber development along a simulated reservoir after three years of conventional SAGD production.

FIG. 6 shows steam chamber development along the 900 m length and 50 m half width of the reservoir after three years of conventional SAGD production. In FIG. 6, chamber development is indicated by saturation gradient, where lighter shades indicate increased gas saturation. FIG. 6 suggests that, after three years, the steam chamber has continued to grow laterally but the steam flow to the production well at the heel has persisted.

Figure 7:
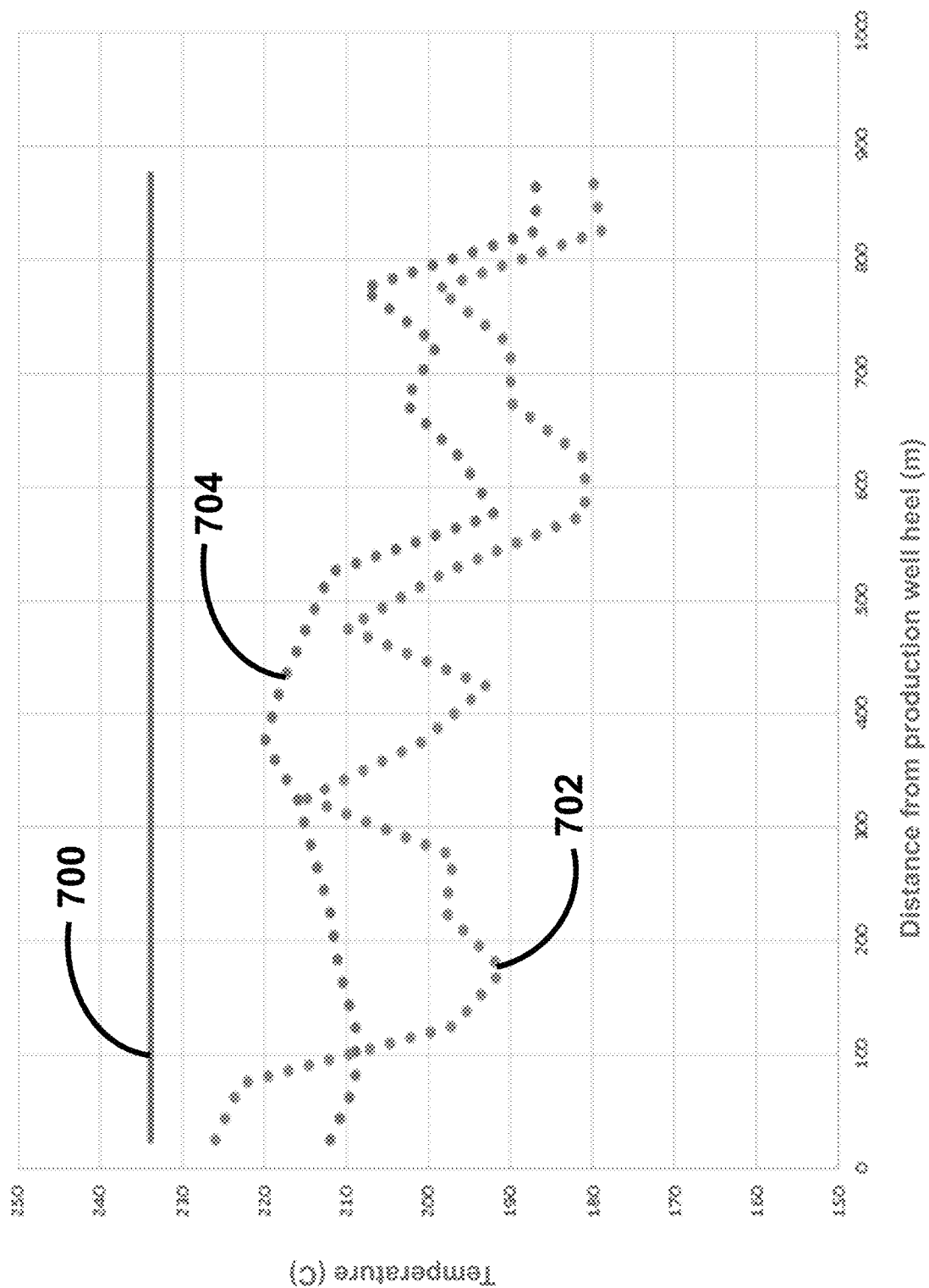
FIG. 7 shows the simulated steam temperature and the simulated temperature profile of a production well after a 24-hour shut-in period following 1.5 years of production in accordance with a method of the present disclosure.

In the method in accordance with the present disclosure, the OCD closest to the heel of the injection well was closed after one year. Closing the OCD closest to the heel reduced steam from flowing from the tubing to the liner at the heel of the injection well resulting in a lower steam pressure in this area of the reservoir and reducing short-circuit steam flow the production well. FIG. 7 highlights the resulting effect. FIG. 7 shows the temperature profile along the production well after a 24 hour shut-in period following 1.5 years of production in accordance with the method of the present disclosure as compared to the conventional SAGD method. In FIG. 7, steam temperature at the injection well is indicated by reference number 700, the inflow temperature along the length of the production well for the conventional SAGD production method is indicated by reference number 702, and the inflow temperature along the length of the production well for the method in accordance with the present disclosure is indicated by reference number 704. Comparing the plot 704 to the plot 502 in FIG. 5 indicates that six months after closing the OCD closest to the heel, the temperature at the heel dropped considerably, and the temperature along the rest of the production well increased as a result of the reduced short circuiting at the heel.

Figure 8:
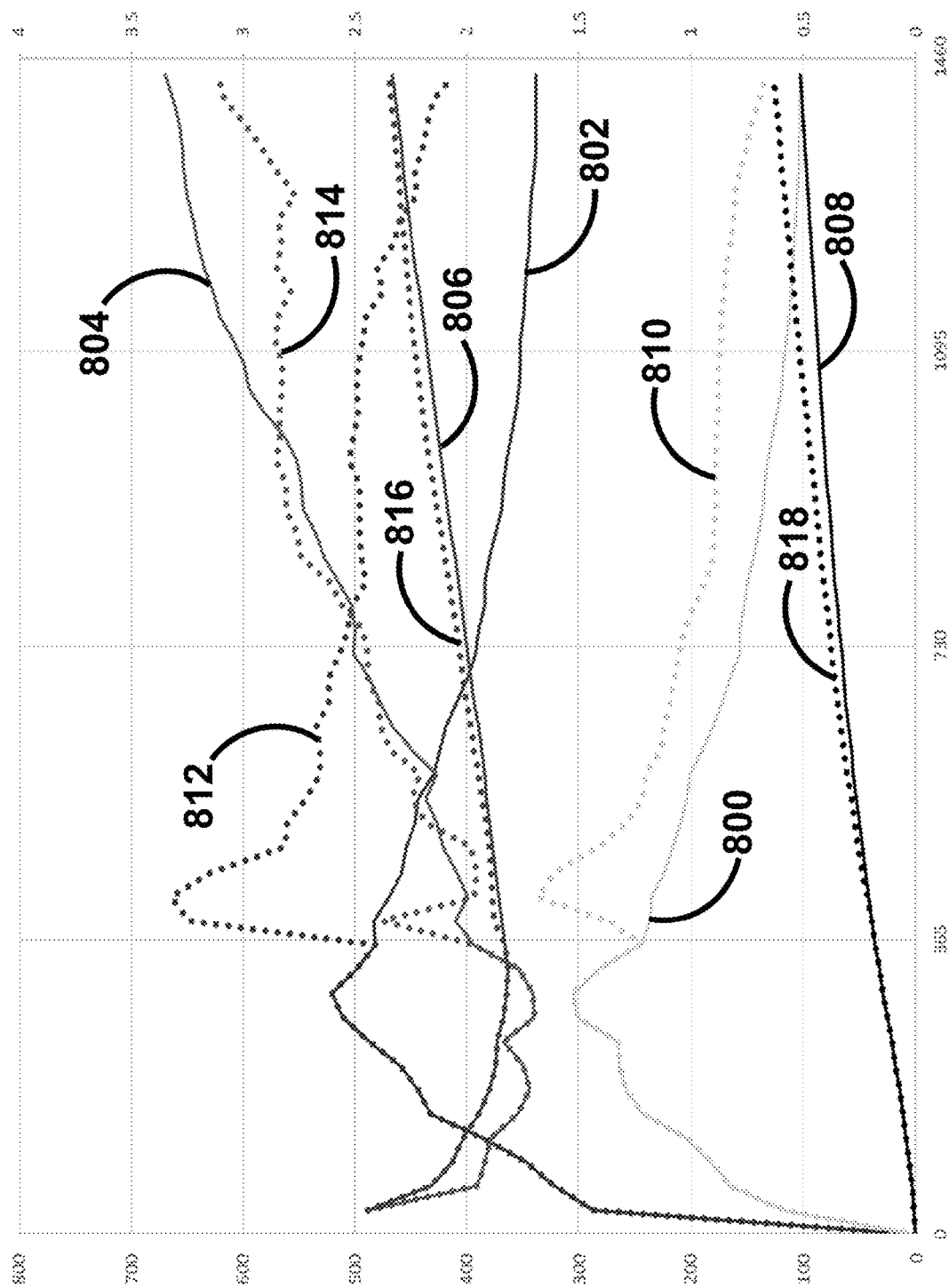
FIG. 8 shows plots of various production parameters as a function of time for both a conventional SAGD method and a method in accordance with the present disclosure.

FIG. 8 shows plots of various production parameters as a function of time for both the conventional SAGD method and the method in accordance with the present disclosure. In FIG. 8, oil production rate, steam injection rate, iSOR, cSOR, and recovery factor are indicated by reference numbers 800, 802, 804, 806, and 808, respectively for the conventional method. In FIG. 8, oil production rate, steam injection rate, iSOR, cSOR, and recovery factor are indicated by reference numbers 810, 812, 814, 816, and 818, respectively for the method in accordance with the present disclosure. FIG. 8 indicates that steam and oil rates both increase immediately after the OCD closest to the heel was closed. The increased steam and oil rates persisted for an extended period of time leading to improved recovery and SOR over the full life of the well pair.

Figure 9:
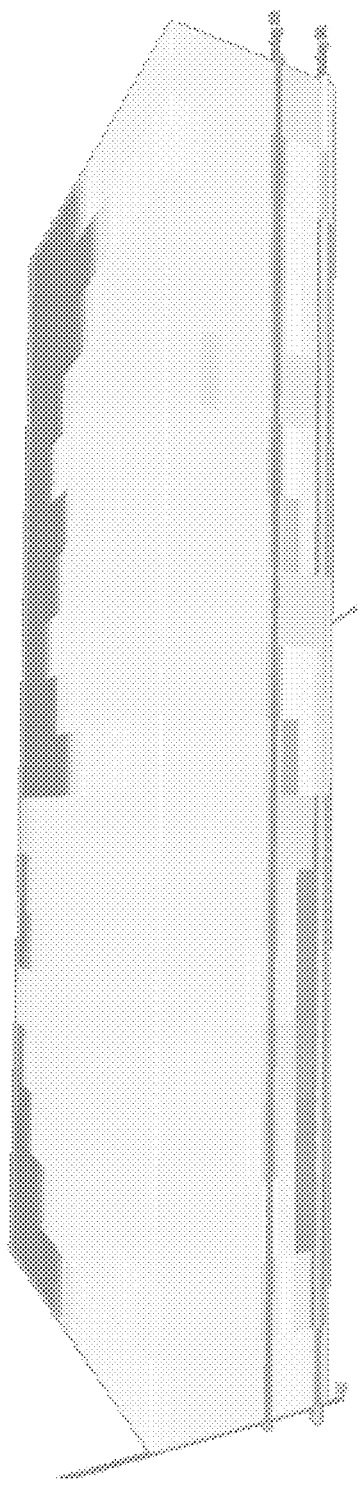
FIG. 9 shows steam chamber development along a simulated reservoir after three years of production with a method in accordance with the present disclosure.

FIG. 9 shows steam chamber development along the 900 m length and 50 m half width of the reservoir after three years of production with the method in accordance with the present disclosure. In FIG. 9, chamber development is indicated by saturation gradient, where lighter shades indicate increased gas saturation. FIG. 9 suggests that, after three years of production, the gas saturation at the heel of the production well improved as did steam chamber conformance along the length of the well pair.

Example 3

In accordance with a method of the present disclosure, after steam chambers have coalesced with steam chambers from neighboring well pairs, OCDs may be opened and/or closed to: (i) mitigate hot and/or cold spots along the production wells, and/or (ii) create pressure gradients in the steam chambers that may sweep high gas-concentration fluids along the steam chamber and/or across from one well pair's steam chamber to an adjacent well pair's steam chamber in order to continue to improve conformance across multiple well pairs or pads.

As set out below with reference to FIG. 10-FIG. 14, simulations were conducted for a conventional SAGD method and a method in accordance with the present disclosure where, during production, the volume and position of mobilizing fluid outflows from a series of injection well were adjusted in response to spatially-distributed reservoir measurements. The simulations were conducted for half of a pad of seven SAGD well pairs in a 20 m thick, Foster-Creek type reservoir. The simulation parameters for Example 2 were the same as those of Example 1. The well pairs were simulated to have 900 m long horizontal sections, and 100 m inter-well spacing. Each of the injection wells was simulated to have four OCDs spaced at 125 m, 325 m, 525 m and 725 m with the heel at 0 m and open toe at 900 m. When considered together, this first set of OCDs was aligned between adjacent wells to create linear arrays aligned perpendicular to the horizontal sections of the injection wells. FIG. 10 shows a schematic representation of the well configuration for the conventional SAGD method in plan view. In FIG. 10, the injection wells are indicated by reference number 1000, the first set of OCDs are indicated by circles, and the linear arrays are indicated by dashed lines. As with the foregoing examples, the simulation of the conventional SAGD method configured all OCDs in the open position after initial start-up operations.

Figure 11B:
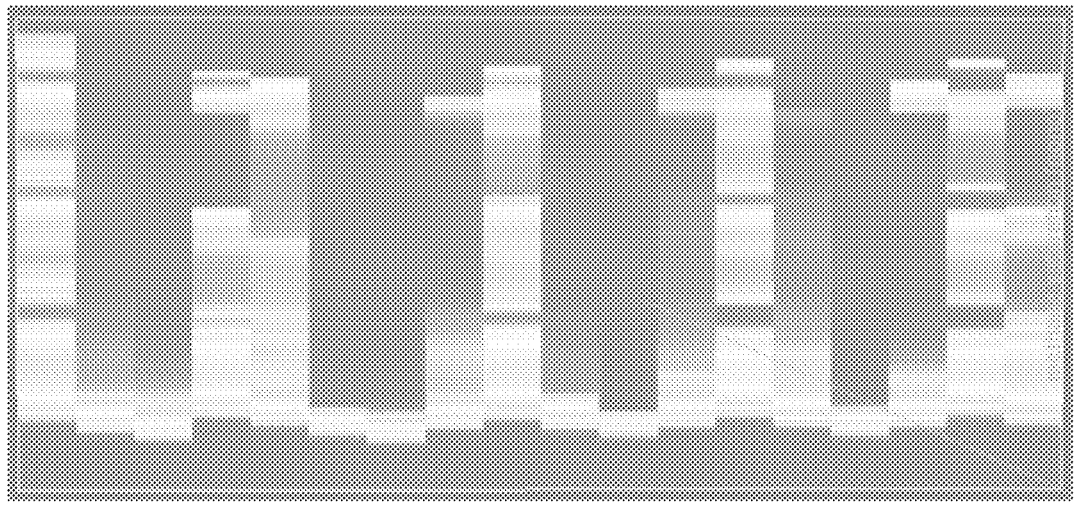
FIG. 11B shows non-condensable gas (NCG) concentration in plan view of a simulated reservoir after three years of conventional SAGD production.
Figure 11A:
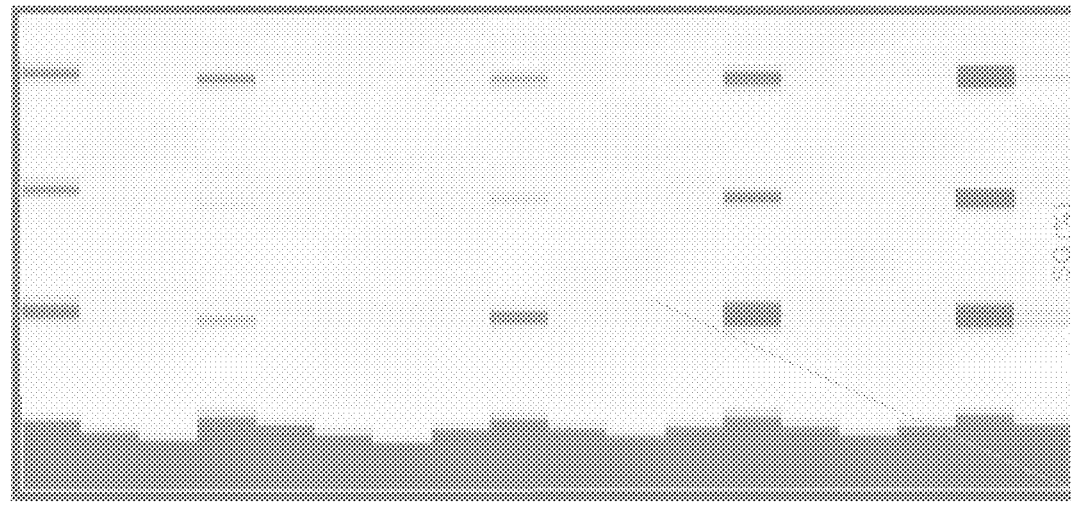
FIG. 11A shows steam chamber development in plan view along a simulated reservoir after three years of conventional SAGD production.

FIG. 11A shows steam chamber development in plan view along the 900 m length and 50 m half width of the reservoir after 6.5 years of conventional SAGD production. In FIG. 11A, chamber development is indicated by saturation gradient, where lighter shades indicate increased gas saturation. FIG. 11B shows non-condensable gas (NCG) concentration in plan view along the 900 m length and 50 m half width of the reservoir after three years of conventional SAGD production. In FIG. 11B, NCG concentration is indicated by saturation gradient, where lighter shades indicate increased NCG saturation (mole fraction methane in the gas phase multiplied by gas saturation). In this simulation, the steam chambers started coalescing after about 3.5 years of conventional SAGD operation with ongoing coalescence leading to about 70% coalescence after six years. At this point in the production phase, the simulation indicates significant quantities of NCG accumulated across the pad, particularly along the median lines between the first set of linear arrays of OCDs.

In the method in accordance with the present disclosure, the well configuration and completions were identical to those of the conventional method, except that the method of the present disclosure utilized a second set of OCDs. The second set of OCDs were also aligned between adjacent wells to create linear arrays aligned perpendicular to the horizontal sections of the injection wells, and the second set of OCDs were offset from the first set of OCDs. FIG. 12 shows a schematic representation of the well configuration for the conventional SAGD method in plan view. In FIG. 12, the injection wells are indicated by reference number 1200, the first set of OCDs are indicated by circles, the second set of OCDs are indicated by squares, and the linear arrays of the second OCDs are indicated by dashed lines. In the method in accordance with the present disclosure, the first set of OCDs was configured in the open position and the second set of OCDs was configured in the closed position until the steam chambers coalesced at 3.5 years. At this point, in response to measurements at the production well, the first set of OCDs was switched to the closed position, and the second set of OCDs was switched to the open position for the duration of the production phase.

Figure 13B:
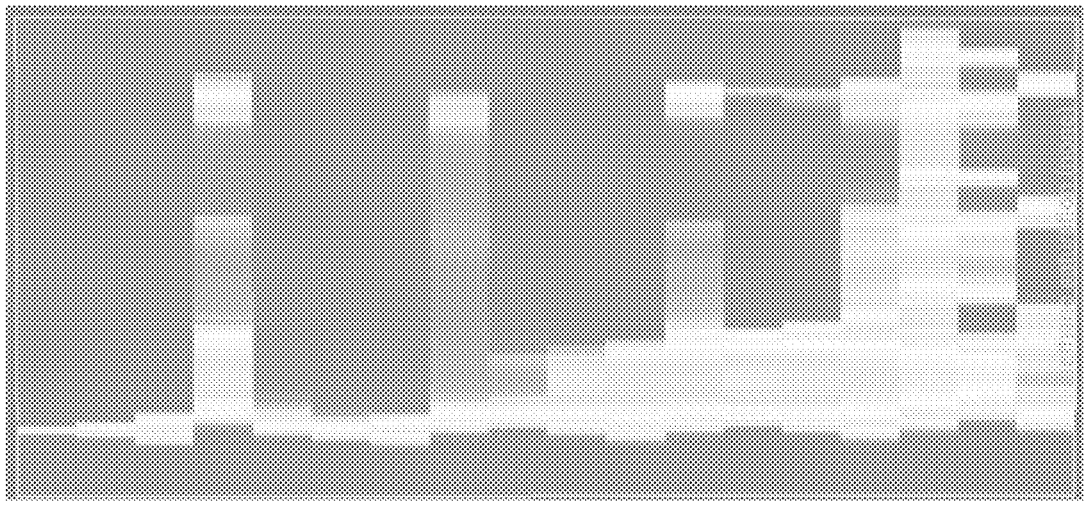
FIG. 13B shows non-condensable gas (NCG) concentration in plan view along a simulated reservoir after six years of production using a method in accordance with the present disclosure.
Figure 13A:
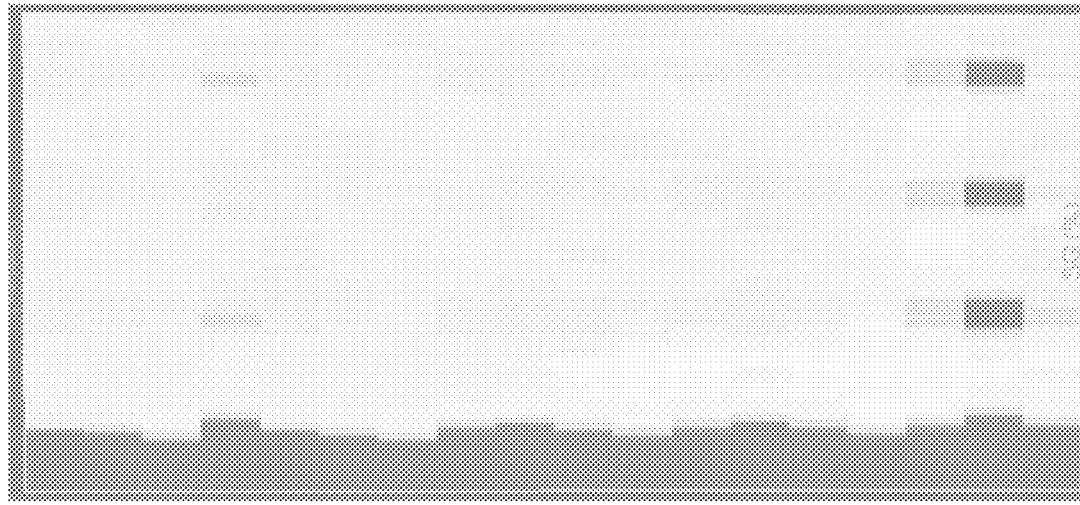
FIG. 13A shows steam chamber development in plan view along a simulated reservoir after six years of production using a method in accordance with the present disclosure.

FIG. 13A shows steam chamber development in plan view along the 900 m length and 50 m half width of the reservoir after 6.5 years of production using the method of the present disclosure. In FIG. 13A, chamber development is indicated by saturation gradient, where lighter shades indicate increased gas saturation. FIG. 13B shows non-condensable gas (NCG) concentration in plan view along the 900 m length and 50 m half width of the reservoir after six years of production using the method of the present disclosure. In FIG. 13B, NCG concentration is indicated by saturation gradient, where lighter shades indicate increased NCG saturation (mole fraction methane in the gas phase multiplied by gas saturation). In this simulation, the steam chambers reached around 95% coalesced after six years with a greatly reduced amount of NCG accumulated across the pad in the central area over the heel sections. Related results indicate that the OCD reconfiguration after 3.5 years changed the pressure gradients along the injection wells (OCD opening at low pressure points) and increasing the pressure so that NCG was swept away. In addition, related results indicate that pressure gradients from the center of the pad to the exterior swept NCG to the outside edge of the exterior steam chambers resulting in reduced NCG accumulation and faster steam chamber growth.

Figure 14:
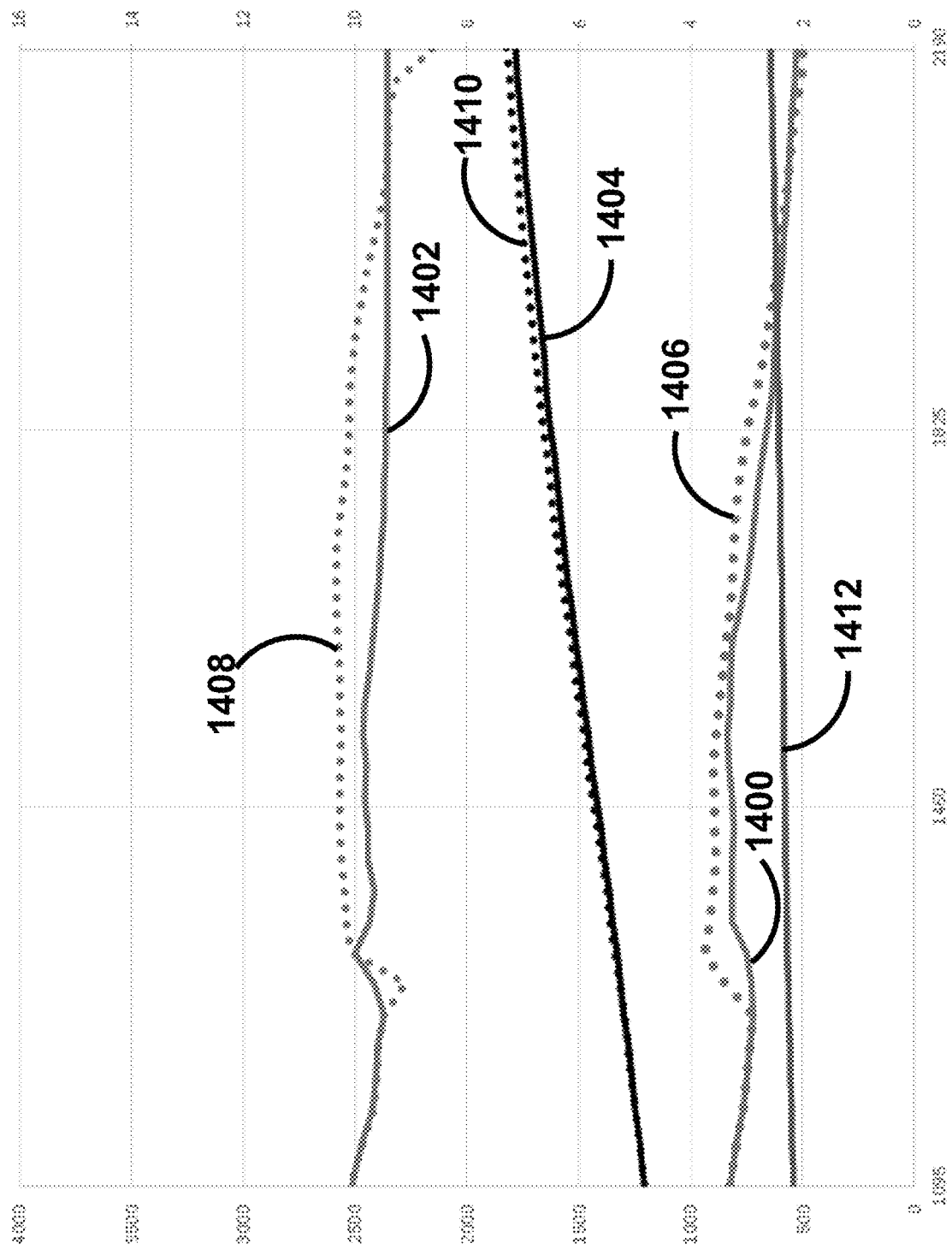
FIG. 14 shows plots of various production parameters as a function of time for both a conventional SAGD method and a method in accordance with the present disclosure.

With respect to performance, a number of improvements from the method of the present disclosure over the conventional SAGD method are highlighted by FIG. 14. FIG. 14 shows plots of various production parameters as a function of time for both the conventional SAGD method and the method in accordance with the present disclosure. In FIG. 14, oil production rate, steam injection rate, and recovery factor (10×RF) are indicated by reference numbers 1400, 1402, and 1404, respectively for the conventional method. In FIG. 14, oil production rate, steam injection rate, and recovery factor are indicated by reference numbers 1406, 1408, and 1410, respectively for the method in accordance with the present disclosure. FIG. 14, further includes cSOR plots for the conventional method and the method in accordance with the present disclosure. These plots substantially overlap and are indicated by a single reference number (1412) in FIG. 14. Comparing plot 1406 to plot 1400 indicates that the method of the present disclosure had a higher oil-production rate than the conventional SAGD method. Comparing plot 1410 to plot 1404 indicates that the method of the present disclosure had a higher recovery factor than the conventional SAGD method.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A method for improving hydrocarbon production from a subterranean reservoir by improving production chamber conformance, wherein the reservoir is located in a formation that is penetrated by a production well and an injection well, the method comprising:
   distributing a mobilizing injection fluid into the formation through a plurality of injection fluid distribution points spaced apart along the injection well to form a production chamber in the reservoir adjacent the injection well and the production well;
   measuring reservoir parameters at spatially distributed measurement points along the production well, the measured reservoir parameters indicative of conformance of the production chamber;
   comparing the measured reservoir parameters at each of the spatially distributed measurement points;
   identifying a measurement indicative of a conformance disparity at one of the spatially distributed measurement points; and
   modulating volume and/or position of mobilizing fluid outflow at at least one of the distribution points based at least in part on the identified measurement indicative of the conformance disparity, thereby correcting for the conformance disparity and improving the production chamber conformance.

2. The method of claim 1, wherein the reservoir parameters are measured at each of the spatially distributed measurement points at a plurality of times.

3. The method of claim 2, wherein the reservoir parameters are measured at each of the spatially distributed measurement points at a first time when production fluids are flowing through the production well and a second time when the production well is shut-in.

4. The method of claim 1, wherein the reservoir parameters comprise temperature measurements, pressure measurements, seismic measurements, acoustic measurements, logging measurements, gas-production measurements, or a combination thereof.

5. The method of claim 1, wherein one or more of the injection fluid distribution points are equipped with an outflow control device (OCD).

6. The method of claim 5, wherein the OCD is a shiftable OCD, and the position of the shiftable OCD is changed in response to the reservoir parameters.

7. The method of claim 1, wherein the injection well comprises a substantially-horizontal section, and injection fluid distribution points are spaced apart along the substantially-horizontal section of the injection well.

8. The method of claim 7, wherein the wherein the production well comprises a substantially-horizontal section, and the substantially-horizontal section of the injection well is spaced apart from and generally parallel to the substantially-horizontal section of the production well.

9. The method of claim 8, wherein the substantially-horizontal section of the injection well is vertically spaced apart above the substantially-horizontal section of the production well.

10. The method of claim 9, wherein the substantially-horizontal section of the injection well is spaced apart from the substantially-horizontal section of the production well by about 2 m to about 20 m, or by about 3 m to about 10 m.

11. The method of any claim 10, wherein the substantially-horizontal section of the production well comprises a production-fluid-permeable liner.

12. The method of claim 11, wherein the production-fluid-permeable liner comprises a louvered screen, a wire-wrapped screen, a slotted liner and/or a mesh-type liner.

13. The method of claim 12, wherein the substantially-horizontal section of the production well comprises one or more inflow control device (ICD).

14. The method of claim 1, wherein the mobilizing injection fluid comprises steam, a solvent, a non-condensable gas (NCG), or a combination thereof.

15. The method of claim 14, wherein the solvent comprises propane, butane, diluent, natural gas condensate, or a combination thereof.

16. The method of claim 15, wherein the NCG comprises methane, ethane, $O_2$, $CO_2$, $N_2$, $CO$, $H_2S$, $H_2$, $NH_3$, flue gas, or a combination thereof.

17. The method of claim 14, wherein the mobilizing fluid consists essentially of steam.

18. The method of claim 1, wherein the subterranean reservoir is a thin pay reservoir having a height of 5 m to 15 m.

19. The method of claim 1, wherein the subterranean reservoir comprises one or more low-permeability strata.

20. The method of claim 19, wherein the one or more low-permeability strata have a permeability of less than about 10 mD.

21. The method of claim 20, wherein the one or more low-permeability strata comprise inclined heterolithic strata (IHS).

* * * * *